US008898771B1

United States Patent
Kim et al.

(10) Patent No.: US 8,898,771 B1
(45) Date of Patent: Nov. 25, 2014

(54) APPARATUS AND METHOD FOR PREVENTING A DANGEROUS USER BEHAVIOR WITH A MOBILE COMMUNICATION DEVICE USING AN INTEGRATED PEDOMETER

(71) Applicants: Christine Hana Kim, San Jose, CA (US); Samuel Seungmin Cho, Fremont, CA (US)

(72) Inventors: Christine Hana Kim, San Jose, CA (US); Samuel Seungmin Cho, Fremont, CA (US)

( * ) Notice: Subject to any disclaimer, the term of this patent is extended or adjusted under 35 U.S.C. 154(b) by 1 day.

(21) Appl. No.: 13/676,064

(22) Filed: Nov. 13, 2012

(51) Int. Cl.
| | |
|---|---|
| G06F 21/00 | (2013.01) |
| H04L 29/06 | (2006.01) |
| G06F 21/30 | (2013.01) |
| G06F 15/00 | (2006.01) |
| G01L 5/00 | (2006.01) |
| G06F 3/0482 | (2013.01) |
| G06F 19/00 | (2011.01) |
| G01C 22/00 | (2006.01) |
| G06M 3/00 | (2006.01) |

(52) U.S. Cl.
CPC ............. G06F 3/0482 (2013.01); G06F 21/30 (2013.01); G06F 15/00 (2013.01); G01L 5/00 (2013.01)
USPC .................................. 726/19; 726/16; 700/91

(58) Field of Classification Search
CPC ............................ G06F 21/445; G06F 21/123
USPC ........................................ 726/19, 16; 700/91
See application file for complete search history.

(56) References Cited

U.S. PATENT DOCUMENTS

2012/0215328 A1 * 8/2012 Schmelzer ...................... 700/91

FOREIGN PATENT DOCUMENTS

JP         2009266060 A  * 11/2009

OTHER PUBLICATIONS

Oliver, Nuria, Fernando Flores-Mangas, and Rodrigo De Oliveira; "Towards wearable physiological monitoring on a mobile phone"; Mobile Health Solutions for Biomedical Applications; Jan. 2009; pp. 208-244.*

* cited by examiner

*Primary Examiner* — Peter Poltorak
*Assistant Examiner* — Courtney Fields
(74) *Attorney, Agent, or Firm* — Invent Capture, LLC.; Samuel S. Cho (57) ABSTRACT

One or more embodiments of an apparatus and a method prevent a dangerous user behavior with a mobile communication device with an integrated pedometer. In a preferred embodiment of the invention, the integrated pedometer comprises a pedometer sensor and an associated software executed on a CPU and a memory unit of the mobile communication device, wherein the pedometer sensor is configured to detect a user's movements and vibrations to determine whether the user is walking or jogging based on a real-time determination from a sensor threshold value and an operation of the associated software. If the integrated pedometer determines that the user is currently walking or jogging, the associated software can dynamically activate a "walking lock" or a "jogging lock," which prevents, prohibits, and/or limits the usage of certain device functions as long as the user is determined to be walking or jogging by the integrated pedometer.

15 Claims, 7 Drawing Sheets

APPARATUS AND METHOD FOR PREVENTING A DANGEROUS USER BEHAVIOR WITH A MOBILE COMMUNICATION DEVICE USING AN INTEGRATED PEDOMETER

BACKGROUND OF THE INVENTION

The present invention generally relates to a portable electronic device. More specifically, the present invention relates to an apparatus and a method for preventing one or more dangerous user behaviors on a mobile communication device using an integrated pedometer.

A modern cellular phone or a similar mobile communication device has evolved into a versatile portable computing device for many consumers. For example, cellular phones, such as "smart phones" or "feature phones," are capable of browsing the Internet and communicate with other users by text or multimedia messages. Modern cellular phones and other mobile communication devices are also capable of executing mobile application software to provide a variety of versatile mobile computing experiences to consumers. While modern cellular phones still serve their original purpose as voice communication devices, Internet browsing, text messaging, mobile application software usage, and other multimedia functions are increasingly becoming critical and essential aspects of the user experience for mobile communication.

Unfortunately, the increasing popularity of Internet browsing, text messaging, mobile application software usage, and other multimedia functions on a cellular phone or on another mobile communication device has also increased the chances of a user distraction and/or a careless self-endangerment during an attention-requiring user activity, such as walking, jogging, and driving. For example, a person who is text-messaging to a friend while walking across a crosswalk may be susceptible to a serious accident by an oncoming vehicle, because that person is overly distracted by his or her cellular phone while not paying sufficient attention to his or her surroundings. Similarly, another person who is interacting or fumbling with a cellular phone or another mobile communication device while walking, jogging, or driving may be subject to running into an obstacle or an object, thereby endangering his or her personal safety and the public safety in general.

In some situations, parents who are concerned about the physical safety of their children due to the children's distracting level of cellular phone or another mobile communication device usage while walking, jogging, or driving may want to prevent, prohibit, and/or limit the usage of certain device features while their children are engaged in walking, jogging, driving, or another attention-requiring activity. Similarly, an employer wanting to enforce certain cellular phone-related or mobile communication device-related safety and legal compliance guidelines against a highly-mobile employee (e.g. a deliveryman, a bus driver, a truck driver, a salesman, and etc.) may want to prevent, prohibit, and/or limit the usage of certain device features while the employee is on duty.

Therefore, an apparatus and a related method that can prevent, prohibit, and/or limit a dangerous user behavior with a mobile communication device to reduce user distraction may be highly beneficial to device users and/or their supervising entities, such as parents or employers. Furthermore, an apparatus and a related method that can calibrate, define, and/or determine a particular user behavior as potentially dangerous may be highly beneficial to device users and/or their supervising entities. In addition, an apparatus and a related method that can authenticate and authorize a supervising entity to enable or disable certain device features while a mobile communication device user is walking, jogging, driving, or performing another attention-requiring activity may also be highly beneficial.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for preventing a dangerous user behavior with a mobile communication device is disclosed. This apparatus comprises a pedometer sensor capable of sensing vibrations and/or movements caused by a mobile communication device user to generate an output value, wherein the pedometer sensor is integrated into a casing of the mobile communication device; a CPU operatively connected to the pedometer sensor inside the casing of the mobile communication device; a memory unit operatively connected to the CPU and also operatively connected to the pedometer sensor; and a software program executed on the CPU and the memory unit, wherein the software program reads the output value from the pedometer sensor to determine whether a walking lock or a jogging lock needs to be enabled to prevent, prohibit, and/or limit usage of one or more functions associated with the mobile communication device, if the mobile communication device user is determined to be walking or jogging by the pedometer sensor and the software program.

In another embodiment of the invention, a method for preventing a dangerous user behavior with a mobile communication device is disclosed. This method comprises the steps of: turning on a walking lock or a jogging lock on a mobile communication device; detecting whether a pedometer sensor integrated in the mobile communication device generates an output reading above a threshold value for walking or jogging; if the output reading is above the threshold value, disabling particular features defined to be disabled under walking lock options menu or jogging lock options menu, wherein the step of disabling the particular features for the walking lock options menu or the jogging lock options menu is provided by a software program executed on a CPU and a memory unit of the mobile communication device; and else if the output reading is below the threshold value, maintaining or activating an enable mode for the particular features under the walking lock options menu or the jogging lock options menu.

Yet in another embodiment of the invention, a method of authorizing a supervisory mode for a supervising entity to prevent a dangerous user behavior with a mobile communication device is disclosed. This method comprises the steps of: activating the supervisory mode for walking or jogging lock safety feature on the mobile communication device; entering an authorization password to control and manage the walking or jogging lock safety feature; if authorization password is correct and if a user lock code needs to be configured: defining or resetting the user lock code associated with the walking or jogging lock safety feature; and if authorization password is correct and if the user lock code does not need to be configured currently: activating or deactivating the walking or jogging lock safety feature on the mobile communication device as the supervising entity.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for preventing, prohibiting, and/or limiting a dangerous user behavior with a mobile communication device using an integrated pedometer. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and do not imply any limitations in the invention.

One aspect of an embodiment of the present invention is to provide an apparatus that can prevent, prohibit, and/or limit a dangerous user behavior with a mobile communication device to reduce user distraction. In one embodiment of the invention, this apparatus may include an accelerometer or another sensor that can serve as a pedometer sensor integrated in a mobile communication device, and a novel software executed on a CPU and a memory unit of the mobile communication device, wherein the novel software can define, calibrate, and determine what constitutes a dangerous user behavior, and wherein the novel software can also manage and control particular preventive or restrictive actions on certain features of the mobile communication device.

Another aspect of an embodiment of the present invention is to provide a novel method implemented on a software program executed on a CPU and a memory unit of a mobile communication device, wherein the novel method can prevent, prohibit, and/or limit a dangerous user behavior with a mobile communication device to reduce user distraction. Yet another aspect of an embodiment of the present invention is to provide an apparatus and a related method that can define, calibrate, and/or determine a particular user behavior as potentially dangerous on a mobile communication device.

Furthermore, an additional aspect of an embodiment of the present invention is to provide an apparatus and a related method that can authenticate and authorize a supervising entity to enable or disable certain device features while a mobile communication device user is walking, jogging, driving, or performing another attention-requiring activity.

For the purpose of describing the invention, a term "dangerous user behavior" is defined as a person's lack of attention or care to his or her surroundings while interacting with a mobile communication device, wherein the person's lack of attention or care to his or her surroundings can result in an accident or an injury. For example, a user text-messaging to a friend using a cellular phone while walking or jogging may be considered a dangerous user behavior. In another example, a user browsing the Internet or running a mobile application software on his or her cellular phone while walking or jogging in a subway station may be considered a dangerous user behavior.

Furthermore, for the purpose of describing the invention, a term "pedometer" is defined as a system capable of sensing, calibrating, and/or determining a user's walking and/or jogging activities while holding or carrying a mobile communication device. In one embodiment of the invention, a pedometer comprises a pedometer sensor that senses movements and a software program executed on a CPU and a memory unit of an electronic device, wherein the software program assists calibration, determination, and counting of a user's walking and/or jogging activities. One example of a pedometer sensor is a one-axis, two-axis, or three-axis accelerometer that may be manufactured as a micro electromechanical systems (MEMS) device. An accelerometer designed as a MEMS device may be integrated into a mobile communication device itself. Another example of a pedometer sensor is a mechanical switch with a counter. This mechanical switch may include a lead ball which can slide back and forth, or a pendulum swinging back and forth. An associated software program can read output values from the pedometer sensor and further calibrate, determine, and/or count the user's walking and/or jogging activities.

Moreover, for the purpose of describing the invention, a term "attention-requiring activity" is defined as any activity that requires a person's attention to perform or operate safely. Examples of attention-requiring activities include, but are not limited to, walking, jogging, and driving.

In addition, for the purpose of describing the invention, a term "mobile communication device" is defined as a portable electronic device which, at a minimum, can display useful information via a display screen or a projected image. Typically, a mobile communication device also provides wireless communication, data storage, and computation capabilities. Examples of mobile communication devices include, but are not limited to, a cellular phone, a portable computer, a tablet device with one or more touch screens, and a portable game device.

Figure 1:
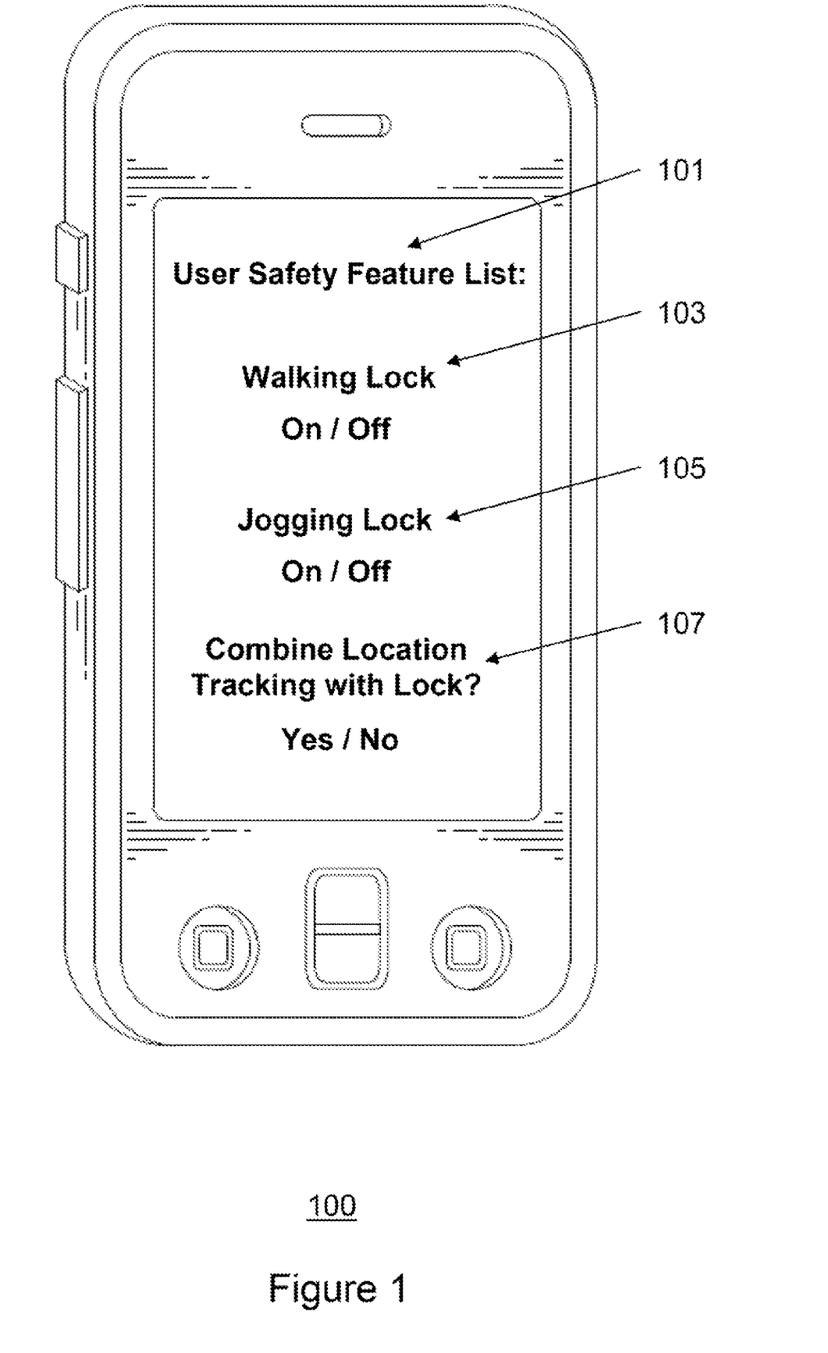
FIG. 1 shows a first screenshot of a mobile communication device that displays a user safety feature list, in accordance with an embodiment of the invention.

FIG. 1 shows a first screenshot (100) of a mobile communication device that displays a user safety feature list (101), in accordance with an embodiment of the invention. In a preferred embodiment of the invention, the mobile communication device integrates a pedometer comprising a pedometer sensor and a software program executed on a CPU and a memory unit of the mobile communication device. In one embodiment of the invention, the pedometer sensor is a one-axis, two-axis, or three-axis accelerometer which is integrated into the mobile communication device as a MEMS device. In another embodiment of the invention, a pedometer sensor is a mechanical switch with a counter. This mechanical switch may include a lead ball which can slide back and forth, or a pendulum swinging back and forth.

In a preferred embodiment of the invention, a software program associated with a pedometer sensor is executed on a CPU and a memory unit of the mobile communication device. This software program is configured to read output values from the pedometer sensor and further calibrate, determine, and/or count the user's walking and/or jogging activities. Furthermore, in one embodiment of the invention, the software program is also configured to control and manage the user safety feature list (101), which may include a "walking lock" (103), a "jogging lock" (105), an option to combine a location tracking feature (107) with the walking lock (103) or the jogging lock feature (105), and/or another mobile communication device functional lock against another attention-requiring activity that qualifies as a dangerous user behavior. Therefore, in one embodiment of the invention, the software program may be also configured to control and manage a "driving lock" or another full or partial function lock during an attention-requiring activity by a mobile communication device user.

Furthermore, in one embodiment of the invention, if the option to combine the location tracking feature (107) with the walking lock (103) and/or the jogging lock (105) is implemented, incorporated, and turned on as part of the user safety feature list, then the walking lock (103) and/or the jogging lock (105) may be enabled only when the location tracking feature (107) informs the software program that the mobile communication device is moving or changing its position for a certain amount of time. Utilizing a combination of real-time location tracking and pedometer sensor-based determination of walking and/or jogging may reduce false lock trigger and may improve usability of the walking lock (103) and/or the jogging lock (105) in some embodiments of the invention. For example, a user may be running on a treadmill and may want the walking lock (103) and/or the jogging lock (105) to remain disengaged, as the user is not placing himself or anyone else in a seriously-dangerous situation in public roads or public places. By turning the option to combine the location tracking feature (107) with the walking lock (103) and/or the jogging lock (105) "on," the user is able to avoid at least some unnecessary walking lock or jogging lock triggers.

In one embodiment of the invention, the location tracking feature (107), when turned on, can utilize Global Positioning System (GPS) receiver to determine whether the mobile communication device is moving or changing its position for a certain amount of time. The GPS receiver is often integrated in today's mobile communication devices as a standard feature for a variety of mobile applications, which makes combining the location tracking feature (107) with the walking lock (103) and/or the jogging lock (105) cost-effective and easy to implement in one embodiment of the invention.

In another embodiment of the invention, the location tracking feature (107) may be completed by tracking cellular base station signal strength changes, wireless LAN signal strength changes, and/or cellular base station identification numbers. Yet in another embodiment of the invention, another real-time location determination technique may be utilized to implement the location tracking feature (107). Yet in another embodiment of the invention, the location tracking feature (107) may use a combination of the GPS receiver-based tracking and other location tracking methods, depending on the availability of GPS signals and other available methods for real-time location determination.

Continuing with FIG. 1, in a preferred embodiment of the invention, the user safety feature list (101) is part of an operating system-level control panel that can enable (i.e. turn on) or disable (i.e. turn off) the walking lock (103), the jogging lock (105), and the location tracking feature combination (107) with the walking lock (103) and/or the jogging lock (105) by a supervising entity to a user on a mobile communication device. In this embodiment of the invention, the user safety feature list (101), the walking lock (103), the jogging lock (105), and the location tracking feature combination (107) with the walking lock (103) and/or the jogging lock (105) are operated and executed as an inherent native function of the operating system with the pedometer sensor and an associated operating system-level software program. In the preferred embodiment of the invention, the supervising entity may be a parent whose child is the user of the mobile communication device under a parental supervision. The supervising entity may also be an employer whose employee is the user of the mobile communication device under a corporate supervision. In an alternate embodiment of the invention, no supervising entity is configured to control and manage the user safety feature list (101), and all control and management functions related to the user safety feature list (101) are merely delegated to the user of a mobile communication device.

In another embodiment of the invention, the user safety feature list (101) is part of a mobile application-level program installed on an operating system of a mobile communication device. In this embodiment of the invention, the user safety feature list (101), the walking lock (103), the jogging lock (105), and the location tracking feature combination (107) with the walking lock (103) and/or the jogging lock (105) are operated and executed as the mobile application-level program with the pedometer sensor and the operating system, instead of being an inherent native function of the operating system.

In one embodiment of the invention, the walking lock (103) can be enabled (i.e. turned on) or disabled (i.e. turned off) by a supervising entity to a mobile communication device. In another embodiment of the invention, the walking lock (103) can be enabled (i.e. turned on) or disabled (i.e. turned off) by a user of the mobile communication device. If the walking lock (103) is enabled, then specific functions and features (e.g. 203, 205, 207 of FIG. 2) of the mobile communication device can be prevented, prohibited, and/or limited from being used or accessed by the user when the pedometer (i.e. comprising a pedometer sensor and an associated software program) determines that the user is currently "walking." In a preferred embodiment of the invention, the pedometer has a threshold value associated with a certain amount of continuous or periodic vibrations and movements for determining a boundary between a "walking" logical state and a "not walking" logical state. For example, if continuous or periodic vibrations and movements sensed by the pedometer sensor is above the threshold value, the walking lock (103) is dynamically enabled to prevent, prohibit, and/or limit the user from utilizing or accessing the specific functions and features (e.g. 203, 205, 207 of FIG. 2) of the mobile communication device under the walking lock (103). If continuous or periodic vibrations and movements sensed by the pedometer sensor is below the threshold value, the walking lock (103) is dynamically disabled, and the specific functions and features (e.g. 203, 205, 207 of FIG. 2) under the walking lock (103) may become accessible by the user.

Furthermore, in one embodiment of the invention, if the option to combine the location tracking feature (107) with the walking lock (103) is implemented, incorporated, and turned on as part of the user safety feature list, then the walking lock (103) may be enabled only when the location tracking combination feature (107) informs the software program that the mobile communication device is moving or changing its position for a certain amount of time. This certain amount of "wait" time (i.e. before determining that the mobile communication device has been moving or changing its position) can be set by a supervising entity or a mobile device communication device user in some embodiments of the invention by adjusting or defining the amount of wait time in an options menu displayed on a touch screen interface or presented to the supervising entity or the mobile device communication device user.

Continuing with FIG. 1, in one embodiment of the invention, the jogging lock (105) can be enabled (i.e. turned on) or disabled (i.e. turned off) by a supervising entity to a mobile communication device. In another embodiment of the invention, the jogging lock (105) can be enabled (i.e. turned on) or disabled (i.e. turned off) by a user of the mobile communication device. If the jogging lock (105) is enabled, then specific functions and features (e.g. 303, 305, 307 of FIG. 3) of the mobile communication device can be prevented, prohibited, and/or limited from being used or accessed by the user when the pedometer (i.e. comprising a pedometer sensor and an associated software program) determines that the user is currently "running" or "jogging." In a preferred embodiment of the invention, the pedometer has a threshold value associated with a certain amount of continuous or periodic vibrations and movements for determining a boundary between a "jogging" logical state and a "not jogging" logical state. For example, if continuous or periodic vibrations and movements sensed by the pedometer sensor is above the threshold value, the jogging lock (105) is dynamically enabled to prevent, prohibit, and/or limit the user from utilizing or accessing the specific functions and features (e.g. 303, 305, 307 of FIG. 3) of the mobile communication device under the jogging lock (105). If continuous or periodic vibrations and movements sensed by the pedometer sensor is below the threshold value, the jogging lock (105) is dynamically disabled, and the specific functions and features (e.g. 303, 305, 307 of FIG. 3) under the jogging lock (105) may become accessible by the user.

Furthermore, in one embodiment of the invention, if the option to combine the location tracking feature (107) with the jogging lock (105) is implemented, incorporated, and turned on as part of the user safety feature list, then the jogging lock (105) may be enabled only when the location tracking combination feature (107) informs the software program that the mobile communication device is moving or changing its position for a certain amount of time. This certain amount of "wait" time (i.e. before determining that the mobile communication device has been moving or changing its position) can be set by a supervising entity or a mobile device communication device user in some embodiments of the invention by adjusting or defining the amount of wait time in an options menu displayed on a touch screen interface or presented to the supervising entity or the mobile device communication device user.

Figure 2:
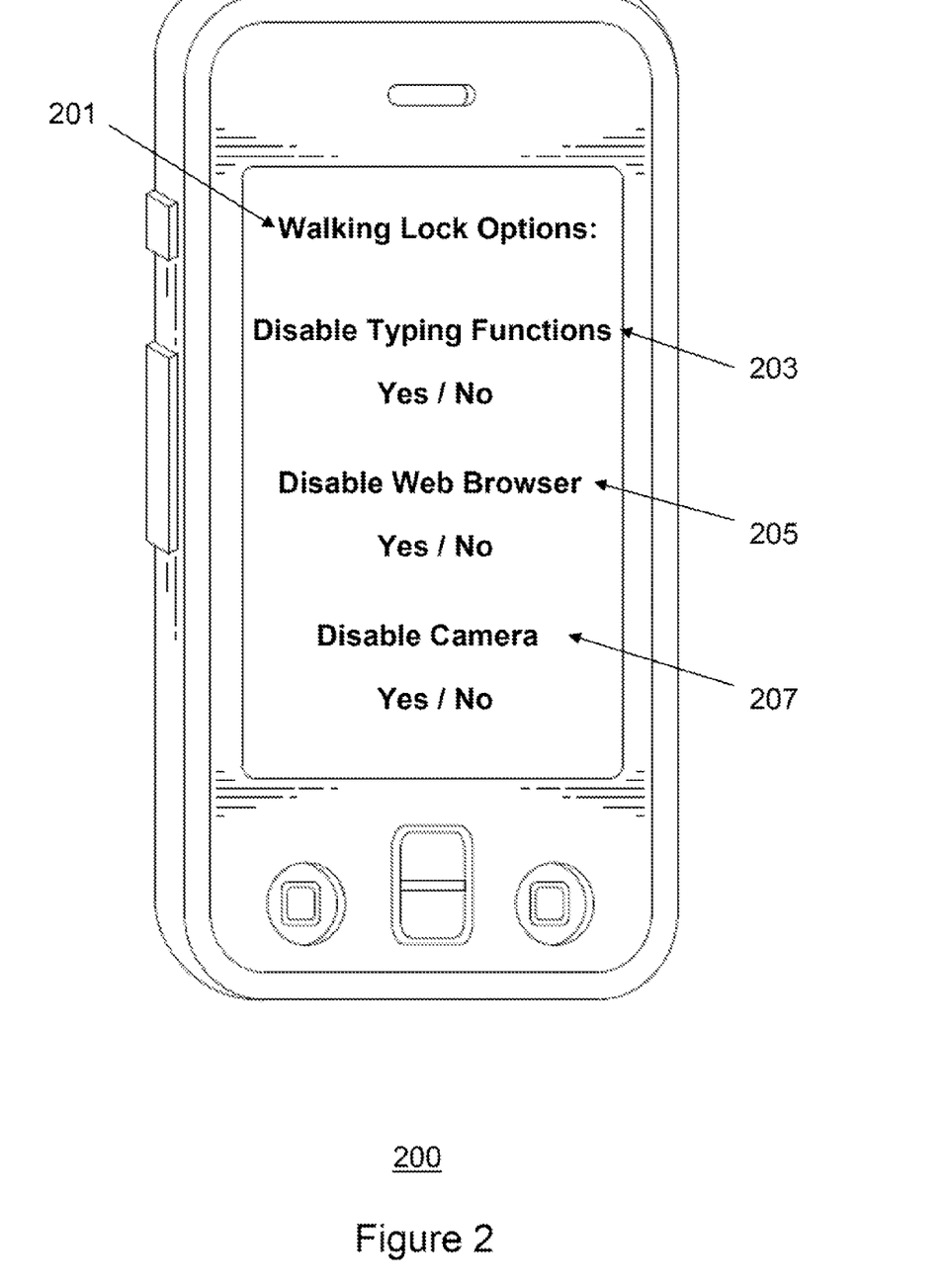
FIG. 2 shows a second screenshot of a mobile communication device that displays a "walking lock" options, in accordance with an embodiment of the invention.

FIG. 2 shows a second screenshot (200) of a mobile communication device that displays a "walking lock" options (201), in accordance with an embodiment of the invention. In a preferred embodiment of the invention, the walking lock options (201) comprises a touch-sensitive and/or remotely-controllable user interface. In the preferred embodiment of the invention, this touch-sensitive and/or remotely-controllable user interface can include a menu to disable typing functions (203), a menu to disable a web browser (205), and a menu to disable camera (207), if the walking lock (i.e. 103 of FIG. 1) is currently "turned on" or enabled. In one embodiment of the invention, menus (e.g. 203, 205, 207) listed under the walking lock options (201) empower a supervising entity or a mobile communication device user to either enable or disable certain functions or features, such as typing, web browsing, or picture taking, when the mobile communication device user is currently determined to be "walking" by an integrated pedometer in the mobile communication device.

In one embodiment of the invention, if a supervising entity, such as a parent or an employer, is configuring the walking lock options (201) and/or the user safety feature list (i.e. 101 of FIG. 1), then a mere user of the mobile communication device may not be able to disable or turn off the walking lock (i.e. 103 of FIG. 1) and/or individual menus (203, 205, 207) listed under the walking lock options (201) without a validated authorization of the supervising entity. An example regarding validation and authorization steps for controlling and managing safety features and lock functions of a mobile communication device by a supervising entity is further described in association with FIG. 7.

In another embodiment of the invention, if there is no supervising entity set up for controlling and managing safety features and lock functions on a mobile communication device, then a mobile communication device user may be empowered with all necessary control and management functions, including setting the user safety feature list (i.e. 101 of FIG. 1) and setting specific menus under the walking lock options (201).

Figure 3:
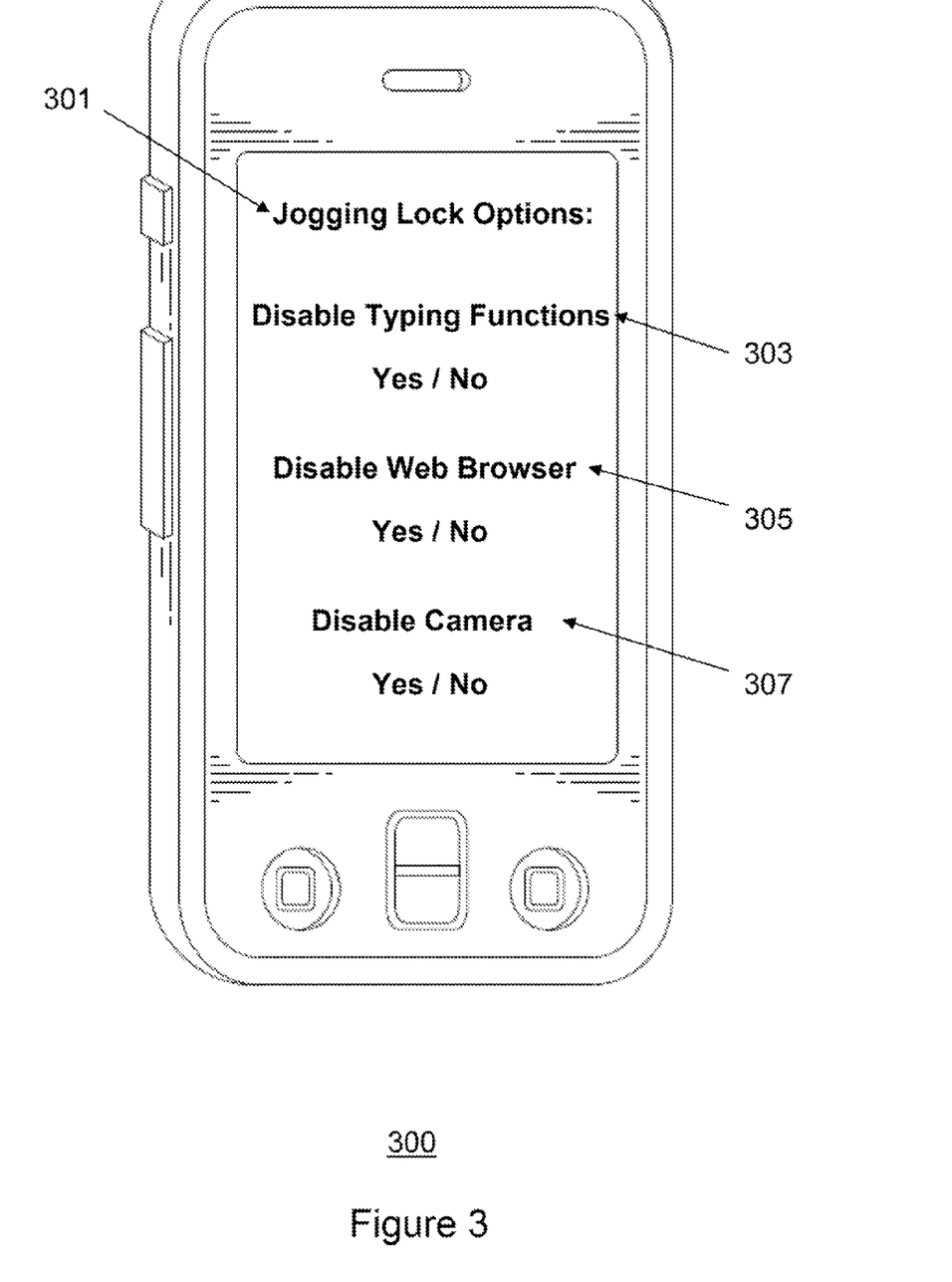
FIG. 3 shows a third screenshot of a mobile communication device that displays a "jogging lock" options, in accordance with an embodiment of the invention.

FIG. 3 shows a third screenshot (300) of a mobile communication device that displays a "jogging lock" options (301), in accordance with an embodiment of the invention. In a preferred embodiment of the invention, the jogging lock options (301) comprises a touch-sensitive and/or remotely-controllable user interface. In the preferred embodiment of the invention, this touch-sensitive and/or remotely-controllable user interface can include a menu to disable typing functions (303), a menu to disable a web browser (305), and a menu to disable camera (307), if the jogging lock (i.e. 105 of FIG. 1) is currently "turned on" or enabled. In one embodiment of the invention, menus (e.g. 303, 305, 307) listed under the jogging lock options (301) empower a supervising entity or a mobile communication device user to either enable or disable certain functions or features, such as typing, web browsing, or picture taking, when the mobile communication device user is currently determined to be "jogging" or "running" by an integrated pedometer in the mobile communication device.

In one embodiment of the invention, if a supervising entity, such as a parent or an employer, is configuring the jogging lock options (301) and/or the user safety feature list (i.e. 101 of FIG. 1), then a mere user of the mobile communication device may not be able to disable or turn off the jogging lock (i.e. 105 of FIG. 1) and/or individual menus (303, 305, 307) listed under the jogging lock options (301) without a validated authorization of the supervising entity. An example regarding validation and authorization steps for controlling and managing safety features and lock functions of a mobile communication device by a supervising entity is further described in association with FIG. 7.

In another embodiment of the invention, if there is no supervising entity set up for controlling and managing safety features and lock functions on a mobile communication device, then a mobile communication device user may be empowered with all necessary control and management functions, including setting the user safety feature list (i.e. 101 of FIG. 1) and setting specific menus under the jogging lock options (301).

Figure 4:
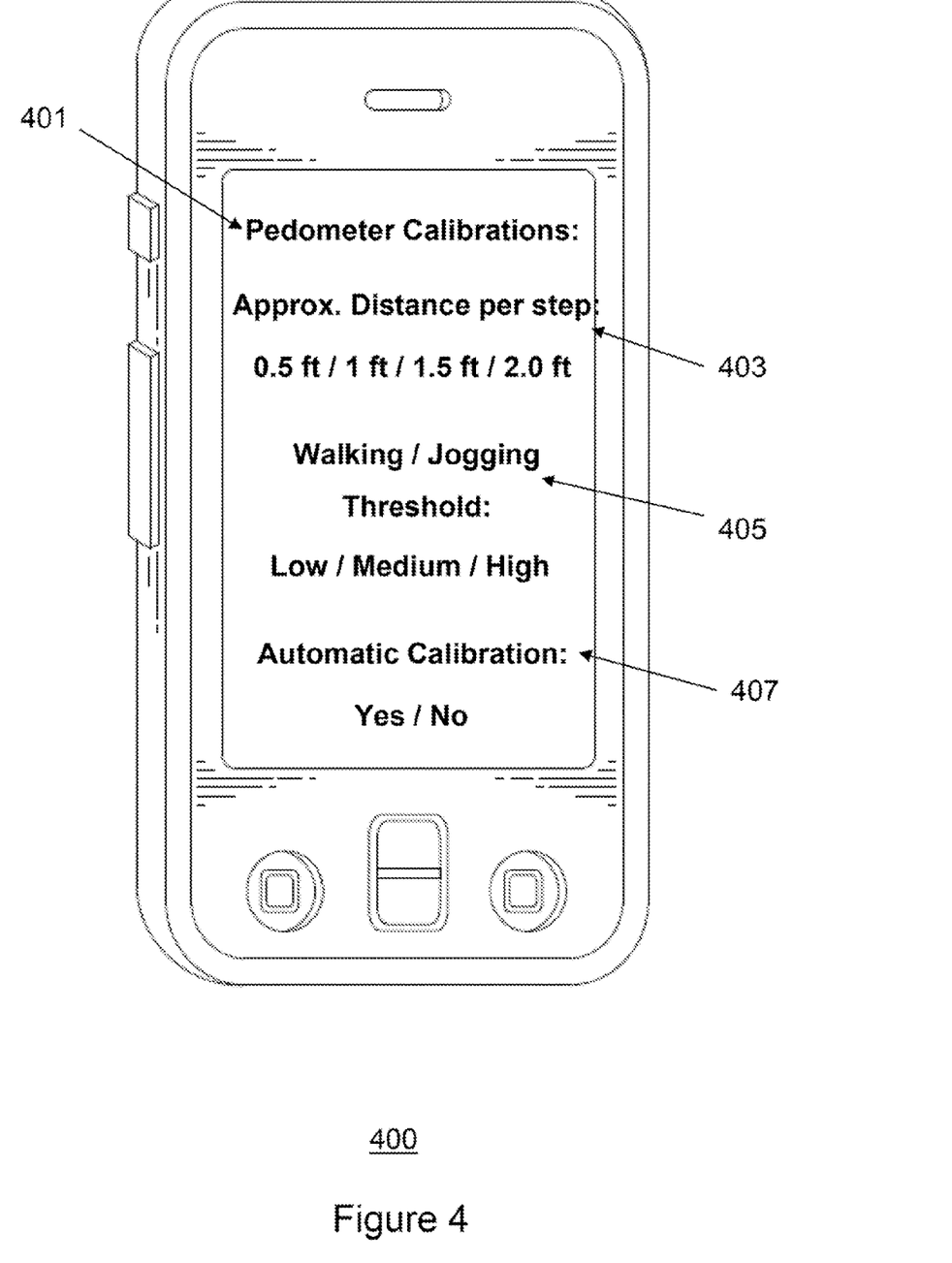
FIG. 4 shows a fourth screenshot of a mobile communication device that displays a "pedometer calibrations" options, in accordance with an embodiment of the invention.

FIG. 4 shows a fourth screenshot (400) of a mobile communication device that displays a "pedometer calibrations" options (401), in accordance with an embodiment of the invention. In a preferred embodiment of the invention, the pedometer calibrations options (401) include a menu to fine-tune or estimate approximate distance per user's step (403), a menu to configure a sensor threshold value for an integrated pedometer (405), and a menu to engage in automatic calibration or manual calibration (407). Because the distance covered by a user may vary depending on particular physical characteristics of the user, the menu to fine-tune or estimate approximate distance per user's step (403) may be useful for improving the accuracy of the integrated pedometer for determining a walking or jogging threshold in a mobile communication device. Furthermore, if the integrated pedometer is also used to measure or approximate actual distance traveled by the user during walking or jogging, the menu to fine-tune or estimate approximate distance per user's step (403) may be highly desirable in some embodiments of the invention.

Moreover, the menu to configure a sensor threshold value for an integrated pedometer (405), as shown in FIG. 4, can be utilized for a walking lock and/or a jogging lock in one embodiment of the invention. In one example, if the sensor threshold value is set "low," then the integrated pedometer is calibrated to be highly sensitive to vibrations and/or movements for a lower-threshold trigger for enabling the walking lock and/or the jogging lock. In another example, if the sensor threshold value is set "medium," then the integrated pedometer is calibrated to be somewhat less sensitive to vibrations and/or movements for a midlevel-threshold trigger for enabling the walking and/or the jogging lock. Yet in another example, if the sensor threshold value is set "high," then the integrated pedometer is calibrated to be even less sensitive to vibrations and/or movements for a higher-threshold trigger for enabling the walking and/or the jogging lock.

Continuing with FIG. 4, in one embodiment of the invention, the menu to engage in automatic calibration or manual calibration (407) can be implemented in association with the integrated pedometer and an associated software executed on a CPU and a memory unit in the mobile communication device. For example, if the automatic calibration is turned on, the integrated pedometer and the associated software may determine a particular threshold value for a walking lock or a jogging lock. In some embodiments of the invention, the automatic calibration may also be able to access physical measurements of a particular user and then deduce approximate distance per that particular user's step (e.g. 0.5 feet, 1.0 feet, 1.5 feet, 2.0 feet, and etc.). On the other hand, if the automatic calibration is turned off from the menu (407), a supervising entity or a mobile communication device user may be able to adjust pedometer calibrations (e.g. 403, 405) manually.

Figure 5:
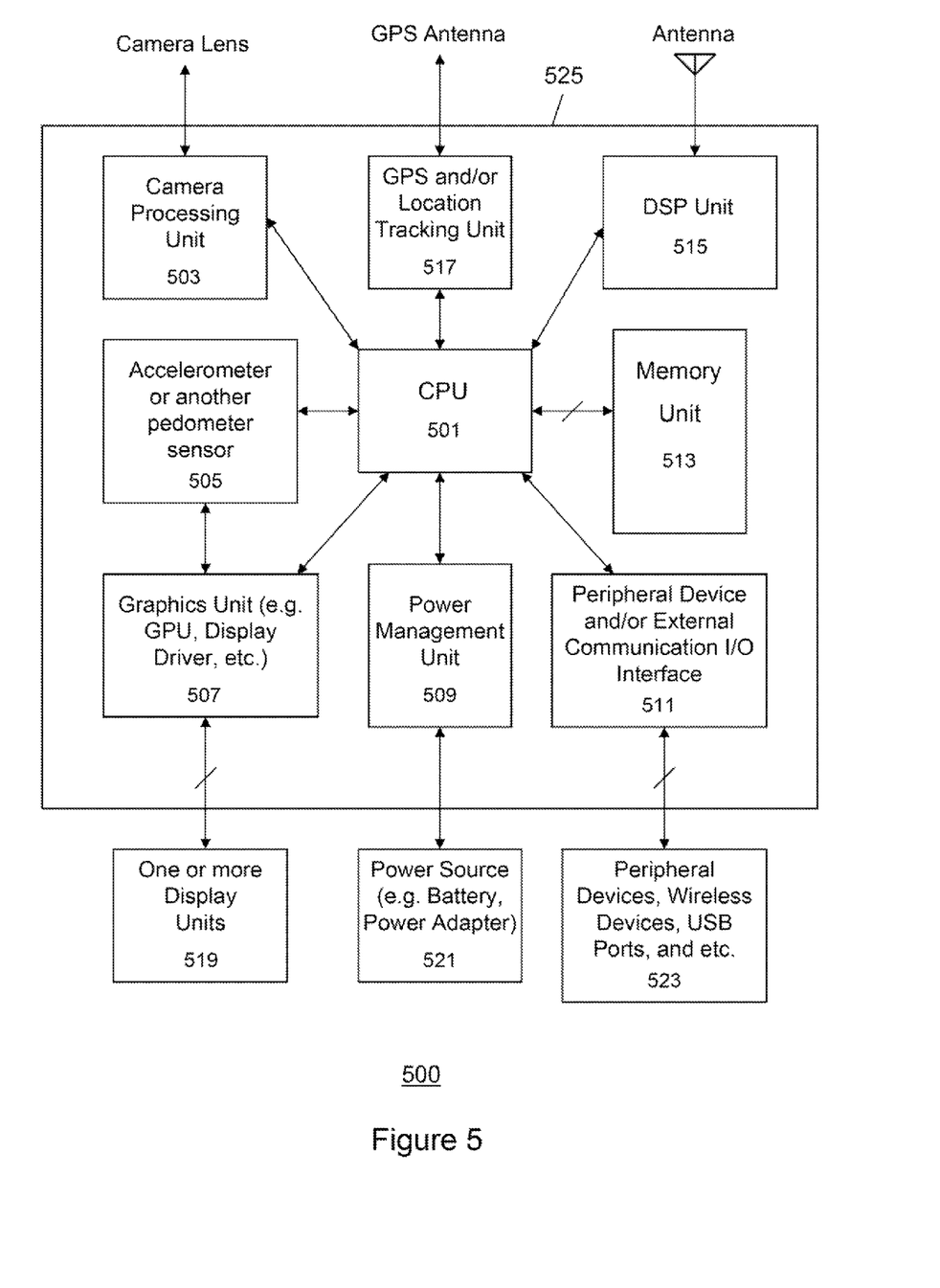
FIG. 5 shows a hardware block diagram for a mobile communication device with an integrated pedometer that can prevent a dangerous user behavior while performing an attention-requiring activity, in accordance with an embodiment of the invention.

FIG. 5 shows a hardware block diagram (500) for a mobile communication device with an integrated pedometer that can prevent a dangerous user behavior while performing an attention-requiring activity, in accordance with an embodiment of the invention. In a preferred embodiment of the invention, the mobile communication device has a CPU (501) which is operatively connected to a memory unit (513), an accelerometer or another pedometer sensor (505), a camera processing unit (503), a graphics unit (507) (e.g. a graphics processor, a display driver, and etc.), a power management unit (509), a peripheral device and/or external communication I/O interface (511), a digital signal processing (DSP) unit (515), a GPS and/or location tracking unit (517), and optionally a sound unit. These logical units may be placed on a single printed circuit board (525) in one embodiment of the invention, or a plurality of printed circuit boards in another embodiment of the invention.

In the preferred embodiment of the invention, the CPU (501) is configured to control each logical unit operatively (i.e. directly or indirectly) connected to the CPU (501). The memory unit (513) typically comprises volatile memory banks based on DRAM's. In some embodiments of the invention, the memory unit (513) may use non-volatile memory technologies such as SRAM's and/or Flash memory. The memory unit (513) is capable of storing programs and applications which can be executed by the CPU (501), the graphics unit (507), or another logical unit operatively connected to the memory unit (513). In particular, in the preferred embodiment of the invention, a software program that controls and manages walking lock and/or jogging lock functions and pedometer calibrations for the accelerometer or another pedometer sensor (505) is executed on the CPU (501) and the memory unit (513) of the mobile communication device. This software program may be part of an operating system of the mobile communication device, or a separate mobile application installed on the operating system of the mobile communication device.

In one embodiment of the invention, the accelerometer or another pedometer sensor (505) is a one-axis, two-axis, or three-axis MEMS device, which is integrated into a body of the mobile communication device. In another embodiment of the invention, the pedometer sensor (505) may be a mechanical switch with a counter. This mechanical switch may include a lead ball which can slide back and forth, or a pendulum swinging back and forth. In general, the accelerometer or another pedometer sensor (505) is controlled and managed by an associated software program executed on the CPU (501) and the memory unit (513), wherein this associated software program can read output values from the accelerometer or another pedometer sensor (505) and further calibrate, determine, and/or count a user's walking and/or jogging activities.

Continuing with FIG. 5, the camera processing unit (503) is operatively connected to a camera lens on the mobile communication device, and is able to process image-related data from the camera lens in association with the CPU (501) and/or other logical units in the mobile communication device. In a preferred embodiment of the invention, if a walking lock or a jogging lock is enabled, the camera processing unit (503) may be at least temporarily restricted or disabled from taking user commands for camera-related operation by the CPU (501) and a software executed on the CPU (501) in association with the pedometer sensor (505), if disabling the camera is selected as part of a walking lock option or a jogging lock option, as previously described in association with FIG. 2 and FIG. 3. Similarly, in the preferred embodiment of the invention, a typing function and/or a web-browsing function may be disabled by the CPU (501) and the software executed on the CPU (501) in association with the pedometer sensor (505), if the walking lock or the jogging lock is enabled and if disabling the typing function and/or the web-browsing function is selected as part of the walking lock option or the jogging lock option.

Furthermore, as shown in FIG. 5, the digital signal processing (DSP) unit (515) is operatively connected to an radio frequency (RF) antenna. The DSP unit (515) is generally configured to receive and transmit radio data and/or voice signals wirelessly for the mobile communication device. Moreover, the power management unit (509) is operatively connected to a power supply unit and a power source (e.g. battery, power adapter) (521), and the power management unit (509) generally controls power supplied to a mobile communication device and its logical units. In addition, the peripheral device and/or external communication I/O interface (511) as shown in FIG. 5 can be operatively connected to one or more peripheral devices, wireless devices, USB ports, and other external data communication media (523).

Continuing with FIG. 5, in the preferred embodiment of the invention, the graphics unit (507) in the system block diagram (500) for the mobile communication device with an integrated pedometer comprises a graphics processor, a display driver, a dedicated graphics memory unit, and/or another graphics-related logical components. In general, the graphics unit (507) is able to process and communicate graphics-related data with the CPU (501), the display driver, and/or the dedicated graphics memory unit. The graphics unit (507) is also operatively connected to one or more display units (519). In addition, the CPU (501) may be operatively connected to the sound unit, which contains audio-related logical components for generation or recording of audio data from the mobile communication device.

Furthermore, the GPS and/or location tracking unit (517) may comprise a GPS signal receiver and/or another real-time location tracking chip, which enable the mobile communication device to detect and determine the real-time change in location and position of the mobile communication device. As described previously, if the option to combine the location tracking (e.g. 107 of FIG. 1) with the walking lock and/or the jogging lock is turned on, then the output from the GPS and/or location tracking unit (517) may be utilized by a software associated with the integrated pedometer to determine when to enable or disable the walking lock and/or the jogging lock.

Figure 6:
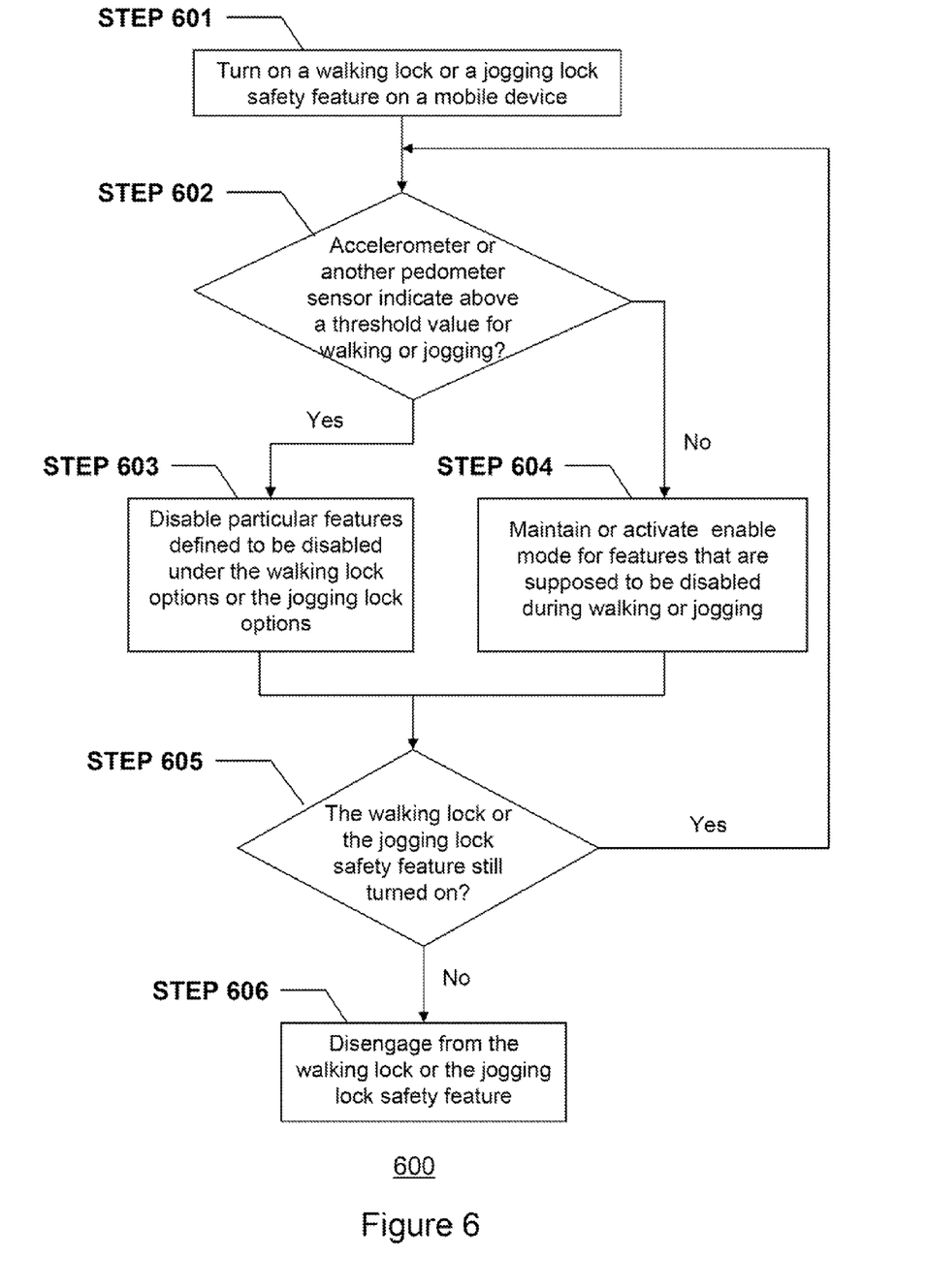
FIG. 6 shows a flowchart for a method of preventing, prohibiting, and/or limiting a dangerous user behavior with a mobile communication device, in accordance with an embodiment of the invention.

FIG. 6 shows a flowchart (600) for a method of preventing, prohibiting, and/or limiting a dangerous user behavior with a mobile communication device using an integrated pedometer, in accordance with an embodiment of the invention. In a preferred embodiment of the invention, a supervising entity, such as a parent to a child, or an employer to an employee, enables a walking lock or a jogging lock safety feature on a mobile communication device, as shown in STEP 601. In another embodiment of the invention, a mobile communication device user himself or herself may enable the walking lock or the jogging lock safety feature on the mobile communication device.

Once the walking lock or the jogging lock safety feature is enabled by either a supervising entity or a mobile communication device user, an accelerometer or another pedometer sensor continuously or periodically senses movements and/or vibrations caused by the mobile communication device user to determine whether a threshold value for walking or jogging is exceeded, as shown in STEP 602. In one embodiment of the invention, if the threshold value for the pedometer sensor is exceeded, then an associated software, which is part of the integrated pedometer system and which operates in a CPU and a memory unit of the mobile communication device, can disable particular features (e.g. 203, 205, 207 of FIG. 2, 303, 305, 307 of FIG. 3) defined to be disabled, restricted, and/or prohibited under the walking lock options or the jogging lock options, as shown in STEP 603. Furthermore, in another embodiment of the invention, if the option to combine the location tracking feature (e.g. 107 of FIG. 1) with the walking lock or the jogging lock is implemented, incorporated, and turned on as part of the user safety feature list (e.g. 101 of FIG. 1), then the walking lock and/or the jogging lock may be enabled only when the location tracking combination feature informs the associated software that the mobile communication device is moving or changing its position for a certain amount of time.

On the other hand, if the threshold value for walking or jogging is not exceeded and/or if the location tracking feature indicates that the mobile communication device is not moving or not changing its position for a certain amount of time, then the associated software, which is part of the integrated pedometer system and which operates in a CPU and a memory unit of the mobile communication device, can maintain or activate "enable" mode for features that are supposed to be disabled, restricted, and/or prohibited during walking or jogging, as shown in STEP 604.

Then, the associated software can check whether the walking lock or the jogging lock remains to be turned on by the supervising entity or the mobile communication device user, as shown in STEP 605. If the walking lock or the jogging lock remains to be turned on, then the associated program loops back to STEP 602, where the pedometer sensor continuously or periodically senses movements and/or vibrations caused by the mobile communication device user to determine whether a threshold value for walking or jogging is exceeded. This loop back ensures that the particular features defined to be disabled under the walking lock options or the jogging lock options remain disabled, restricted, and/or prohibited as long as the mobile communication device user is determined to be walking or jogging. Likewise, the loop back also ensures that the particular features defined to be disabled under the walking lock options or the jogging lock options are enabled for use whenever the mobile communication device user is determined to be not walking or not jogging.

Continuing with FIG. 6, when the walking lock or the jogging lock is turned off by the supervising entity or the mobile communication device user as also shown in STEP 605, then the pedometer comprising the pedometer sensor and the associated software can disengage from the walking lock or the jogging lock safety feature for the mobile communication device, as shown in STEP 606. The method of preventing, prohibiting, and/or limiting a dangerous user behavior with the mobile communication device using the integrated pedometer, as shown in this embodiment of the invention uniquely provides real-time enablement and disablement of the walking lock or the jogging lock, depending on currently-sensed movements and/or vibrations from the pedometer sensor and the associated software. The authority of enabling or disabling the walking lock or the jogging lock may be given to the supervising entity or the mobile communication device user himself or herself, depending on a particular implementation of an embodiment of the present invention.

Figure 7:
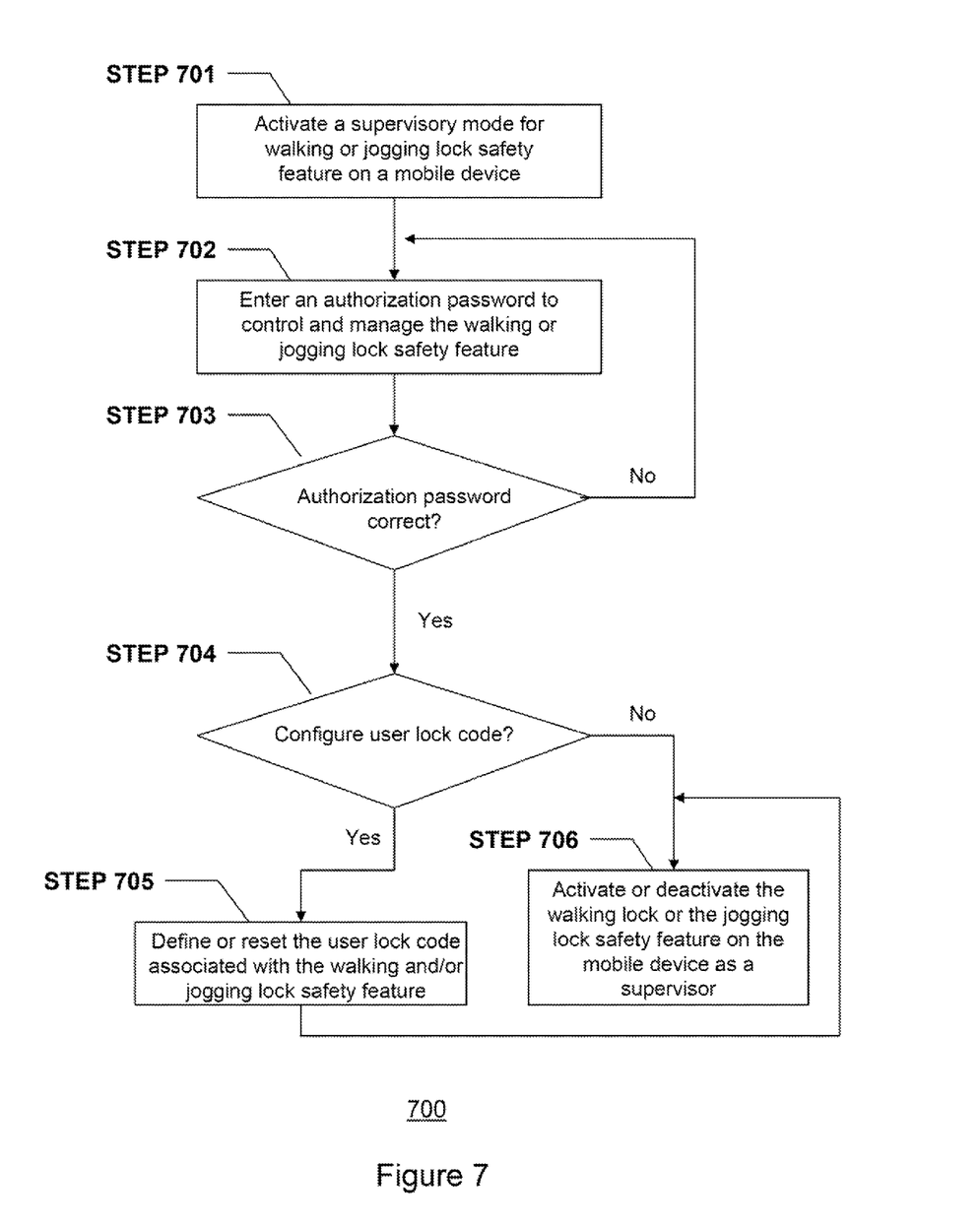
FIG. 7 shows a flowchart for a method of authorizing and authenticating a supervisory mode for walking or jogging lock safety feature on a mobile communication device, in accordance with an embodiment of the invention.

FIG. 7 shows a flowchart (700) for a method of authorizing and authenticating a supervisory mode for walking or jogging lock safety feature on a mobile communication device, in accordance with an embodiment of the invention. In a preferred embodiment of the invention, a supervising entity, such as a parent to a child, or an employer to an employee, can activate a supervisory mode for walking or jogging lock safety feature on a mobile communication device, as shown in STEP 701. In the preferred embodiment of the invention, the activation of the supervisory mode is performed on a touch screen interface, a physical key interface, or a computer interface, wherein the supervisory mode is at least partially operated by a software executed on a CPU and a memory unit of the mobile communication device, wherein this software is associated with a pedometer sensor integrated in the mobile communication device. In one embodiment of the invention, the supervisory mode is also partially operated by a computer server or another electronic device operatively connected to the mobile communication device for data and/or voice communication, wherein the computer server or the other electronic device may execute another software in its CPU and its memory unit for supervisory and remote management and control of the mobile communication device.

Once the supervisory mode for the walking or jogging lock safety feature is activated in STEP 701, the supervising entity is asked to enter an authorization password to control and manage the walking or the jogging lock safety feature, as shown in STEP 702. This step ensures that only an authorized entity that is validated as the supervising entity can define, enable, disable, control, and manage the walking or jogging lock safety feature for the mobile communication device. If the authorization password is incorrect, then the supervising entity is asked to re-enter the password until the password is validated, as shown in STEP 703. On the other hand, if the authorization password is correct, then the supervising entity is asked to configure a user lock code, as shown in STEP 704. In one embodiment of the invention, the user lock code is a password that the mobile communication device user has to enter to take control or override the supervisory mode for walking or jogging lock safety feature on the mobile communication device. The supervising entity may want to set up the user lock code, so that a qualified mobile communication device user can override the supervisory mode for certain situations, while preventing at least some users from altering the mobile communication device for the walking or jogging lock safety feature.

Continuing with FIG. 7, if the supervising entity does not want to set up and configure the user lock code, then the supervising entity can proceed to activate or deactivate the walking or jogging lock safety feature on the mobile communication device as a supervisor, as shown in STEP 706. On the other hand, if the supervising entity wants to set up and configure the user lock code, then the supervising entity can define or reset the user lock code associated with the walking and/or jogging lock safety feature, as shown in STEP 705, and then proceed to STEP 706 for activating or deactivating the walking or jogging lock safety feature on the mobile communication device as the supervisor.

The present invention in various embodiments as described for FIGS. 1-7 provides several advantages to mobile communication device users and supervising entities to the mobile communication device users. In particular, one or more embodiments of the present invention can prevent, prohibit, and/or limit a user from performing a dangerous user behavior, such as walking and/or jogging while using a mobile communication device, thereby reducing user distraction to improve the safety of the user. Furthermore, one or more embodiments of the present invention can calibrate, define, and/or determine a particular user behavior as potentially dangerous to further improve the safety of a mobile communication device user and can also benefit his or her supervising entity. In addition, by providing an apparatus and a method to authenticate and authorize a supervising entity to enable or disable certain device features while a mobile communication device user is walking, jogging, driving, or performing another attention-requiring activity, one or more embodiments of the present invention enables dynamic enforcement or compliance for certain safety guidelines against one or more supervised mobile communication device users by the supervising entity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for preventing a dangerous user behavior with a mobile communication device, the apparatus comprising:
    a pedometer sensor capable of sensing vibrations or movements caused by a mobile communication device user to generate an output value, wherein the pedometer sensor is integrated into a casing of the mobile communication device;
    a CPU operatively connected to the pedometer sensor inside the casing of the mobile communication device;
    a memory unit operatively connected to the CPU and also operatively connected to the pedometer sensor; and
    a software program executed on the CPU and the memory unit, wherein the software program generates a user safety feature list menu for prevention of dangerous user behavior on a touch screen, wherein the user safety feature list menu comprises a jogging lock on/off switch, a walking lock on/off switch, a location tracking-based walking and jogging lock accuracy improvement switch, a "walking lock options" sub-menu, and a "jogging lock options" sub-menu, each sub-menu of which incorporates at least one of a "disable typing function" switch, a "disable web browser" switch, and a "disable camera" switch within the walking lock options sub-menu and the jogging lock options sub-menu, and wherein the software program also reads the output value from the pedometer sensor to determine whether a walking lock or a jogging lock needs to be enabled to prevent, prohibit, or limit usage of one or more functions listed under the walking lock options sub-menu and the jogging lock options sub-menu, if the mobile communication device user is determined to be walking or jogging by the pedometer sensor and the software program.

2. The apparatus of claim 1, further comprising a graphics unit operatively connected to the CPU, and a display unit operatively connected to the graphics unit.

3. The apparatus of claim 1, further comprising a camera processing unit, a digital signal processing unit, and a power management unit inside the mobile communication device, wherein the power management unit is operatively connected to a power source.

4. The apparatus of claim 1, wherein the walking lock or the jogging lock prevents, prohibits, and/or limits the mobile communication device user from accessing or using one or more functions associated with the mobile communication device, if the software program determines that the output value from the pedometer sensor is above a threshold value for walking or jogging, thereby enabling the walking lock or the jogging lock.

5. The apparatus of claim 1, wherein the walking lock or the jogging lock is disabled to allow one or more functions associated with the mobile communication device to be accessed or used by the mobile communication device user, if the software program determines that the output value from the pedometer sensor is below a threshold value for walking or jogging.

6. The apparatus of claim 1, wherein the pedometer sensor is a single axis or multi-axis MEMS accelerometer.

7. The apparatus of claim 1, further comprising a GPS signal receiver unit configured to provide real-time location tracking information to the software program for more accurate determination of enabling the walking lock or the jogging lock.

8. The apparatus of claim 2, wherein the pedometer calibrations options includes a menu to fine-tune or estimate approximate distance per user's step, a menu to configure a sensor threshold value for an integrated pedometer, and a menu to engage in automatic calibration or manual calibration.

9. A method for preventing a dangerous user behavior with a mobile communication device, the method comprising the steps of:
- turning on a walking lock or a jogging lock on a mobile communication device;
- generating a user safety feature list menu for prevention of dangerous user behavior on a touch screen by a software program executed on a CPU and a memory unit of the mobile communication device, wherein the user safety feature list menu comprises a jogging lock on/off switch, a walking lock on/off switch, a location tracking-based walking and jogging lock accuracy improvement switch, a "walking lock options" sub-menu, and a "jogging lock options" sub-menu, each sub-menu of which incorporates at least one of a "disable typing function" switch, a "disable web browser" switch, and a "disable camera" switch within the walking lock options sub-menu and the jogging lock options sub-menu;
- detecting whether a pedometer sensor integrated in the mobile communication device generates an output reading above a threshold value for walking or jogging;
- when the output reading is above the threshold value, disabling particular features defined under the walking lock options sub-menu or the jogging lock options sub-menu; and
- else when the output reading is below the threshold value, maintaining or activating an enable mode for the particular features under the walking lock options sub-menu or the jogging lock options sub-menu.

10. The method of claim 9, wherein the step of disabling the particular features defined to be disabled under the walking lock options sub-menu or the jogging lock options sub-menu does not engage unless a real-time location tracking method confirms that the mobile communication device is currently moving or changing its position, when the location tracking-based walking and jogging lock accuracy improvement switch is turned on.

11. The method of claim 9, further comprising a step of checking whether the walking lock or the jogging lock is still turned on.

12. The method of claim 11, further comprising a step of looping back to the step of detecting whether the pedometer sensor generates the output reading above the threshold value for walking or jogging, if the step of checking whether the walking lock or the jogging lock is still turned on indicates that the walking lock or the jogging lock is still turned on.

13. The method of claim 11, further comprising a step of disengaging from the walking lock or the jogging lock, if the step of checking whether the walking lock or the jogging lock is still turned on indicates that the walking lock or the jogging lock is turned off.

14. A method of authorizing a supervisory mode for a supervising entity to prevent a dangerous user behavior with a mobile communication device, the method comprising the steps of:
- generating a user safety feature list menu for prevention of dangerous user behavior on a touch screen by a software program executed on a CPU and a memory unit of the mobile communication device, wherein the user safety feature list menu comprises a jogging lock on/off switch, a walking lock on/off switch, a location tracking-based walking and jogging lock accuracy improvement switch, a "walking lock options" sub-menu, and a "jogging lock options" sub-menu, each sub-menu of which incorporates at least one of a "disable typing function" switch, a "disable web browser" switch, and a "disable camera" switch within the walking lock options sub-menu and the jogging lock options sub-menu;
- activating the supervisory mode for the user safety feature list menu for walking or jogging lock safety features on the mobile communication device;
- entering an authorization password to control and manage the walking or jogging lock safety features;
- when the authorization password is correct and when a user lock code needs to be configured, wherein the user lock code prevents a mobile communication device user from altering the walking or jogging lock safety features set by the supervising entity, unless a correct user lock code is entered by the mobile communication device user:
  - defining or resetting the user lock code associated with the walking or jogging lock safety features; and
- else when the authorization password is correct and when the user lock code does not need to be configured currently:
  - activating or deactivating the walking or jogging lock safety features on the mobile communication device as the supervising entity.

15. The method of claim 14, wherein the step of activating or deactivating the walking or jogging lock safety feature as the supervising entity is performed wirelessly and remotely to the mobile communication device.

\* \* \* \* \*